3,522,318
PHENOLS
Stanley Ashton, Norman Gunning Bromby, Ronald James Hurlock, and Vijay Ratna Sharma, Manchester, England, assignors to Imperial Chemical Industries Limited, London, England, a corporation of Great Britain
No Drawing. Filed June 21, 1968, Ser. No. 738,840
Claims priority, application Great Britain, June 26, 1967, 29,428/67
Int. Cl. C07c 43/20
U.S. Cl. 260—613     1 Claim

ABSTRACT OF THE DISCLOSURE 2,4,6-tris(3',5'-dialkyl-4'-hydroxybenzyl)phenyl ethers, preferably carrying alkyl groups in the 3 and 5 positions, are used as stabilisers for polymers, particularly polyolefins. These compounds are prepared from the corresponding 3,5-dialkyl-4-hydroxybenzyl alcohols by reaction with phenyl ethers optionally carrying alkyl groups in the 3 and 5 positions.

---

This invention relates to phenols and more particularly to certain p-hydroxybenzylaryl ethers of value as stabilisers for polymers.

According to the invention there are provided new phenols of the formula

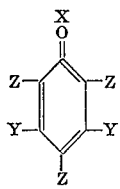

wherein X represents an optionally substituted alkyl, cycloalkyl, aralkyl, or aryl group, each Y, which may be the same or different, represents a hydrogen atom or an alkyl group, and each Z represents a p-hydroxybenzyl group of the formula

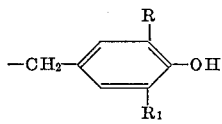

wherein R and $R_1$ each stand for an alkyl or cycloalkyl group.

As examples of groups which may be represented by X there may be mentioned particularly methyl but also other alkyl groups such as ethyl, n-propyl, n-butyl, n-octyl and n-dodecyl. As substituted alkyl groups there may be mentioned especially alkylene groups such as ethylene joining two phenolic residues, but also groups such as β-hydroxyethyl, hydroxypropyl and ω-hydroxypolyalkyleneoxyalkylene.

As examples of alkyl groups which may be represented by Y there may be mentioned methyl, ethyl, isopropyl and n-butyl. Preferred are groups containing not more than 2 carbon atoms and particularly methyl.

As examples of groups which may be represented by R and $R_1$ there may be mentioned methyl, ethyl, propyl, tert.-butyl, tert.-octyl, isopropyl, cyclohexyl, and α-methylcyclohexyl. R and $R_3$ may be the same or different. Preferred groups are tertiary groups particularly tertiary alkyl especially butyl groups.

As examples of phenols of the invention there may be mentioned 2,4,6-tris(3,5-di-tert.-butyl-4-hydroxybenzyl)-3,5 - dimethylanisole, 2,4,6 - tris(3,5-di-tert.-butyl-4-hydroxybenzyl) - 3,5-diethylanisole, 2,4,6-tris(3,5-di-tert.-butyl-4-hydroxybenzyl) - 3-ethyl-5-methylanisole, 1,2-bis-[2,4,6-tris(3,5-di-tert.-butyl-4-hydroxybenzyl) - 3,5 - dimethylphenoxy]ethane.

According to a further feature of the invention there is provided a process for the manufacture of a phenol of the invention which comprises reacting a compound of the formula

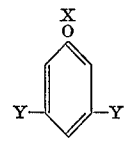

wherein X and Y have the significances given earlier with substantially three molar proportions of a methylolphenol or derivative thereof of the formula

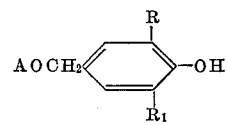

wherein R and $R_1$ have the significances given earlier and A represents a hydrogen atom, a lower alkyl or a lower acyl group.

As groups which may be represented by A there may be mentioned methyl, ethyl, formyl, propionyl and particularly acetyl.

The process of the invention is preferably carried out in presence of a condensing agent for example hydrogen chloride, sulphuric acid, or a Friedel-Crafts catalyst, such as zinc chloride, aluminium chloride or boron trifluoride.

The process may be carried out in a solvent such as dialkyl ether, methylene chloride, 1,1,1-trichloroethane, benzene or toluene, and preferably at a temperature slightly below room temperature, although higher temperatures may be used if desired.

According to a still further feature of the invention there is provided a process for the stabilisation of polymers which comprises incorporating into the polymer a phenol of the invention.

As polymers there may be mentioned for example natural and synthetic rubbers, polymers of diolefins with ethylenically unsaturated monomers, polymers of ethylenically unsaturated compounds such as ethylene, propylene, 4-methylpentene-1, isoprene, butadiene, vinylchloride and particularly polyolefins such as polyethylene, polypropylene, poly-4-methylpentene-1 and copolymers of these with other olefins, copolymers of for example acrylonitrile, butadiene and styrene, polyvinyl chloride, polyamides such as polyhexamethylene adipamide, polyesters such as polyethylene terephthalate and polyurethanes.

The phenol may be incorporated into the polymer by any conventional procedure. For example by dissolving the phenol in a volatile solvent, mixing with the polymer in powder form and evaporating; by mixing the phenol and the polymer in powder form or by hot milling the components together; or by extrusion compounding.

Suitable amounts of the phenol are from 0.001 to 5% and preferably from 0.1 to 2% of the weight of the polymer.

The stabilising effect of the phenol is enhanced in many cases by the incorporation also into the polymer of other stabilisers, for example sulphides such as dilauryl or dioctadecyl thiodipropionates or thiodibutyrates, bis(2-hydroxy-5-methylbenzyl)sulphide, bis(3-tert.-butyl-2-hydroxy-5-methoxy-benzyl)sulphide, 2,2' - dihydroxy-5,5'-dimethyldiphenylsulphide, metal dialkyl dithiophosphates, metal dialkyldithiocarbamates, trialkyltrithiophosphites, phosphites such as trialkyl or triaryl phosphites or alkyl phosphites, monoesters of phosphorous acid such as mono-2,2'-dihydroxymethylbutyl phosphite and mono-2,2'-dihydroxymethylpropyl phosphite, or phenols such as 2,6-ditert.-butyl-4-methylphenol, 4,4' - thiobis(3-methyl-6-tert.-butylphenol, 1,3,5 - trimethyl-2,4,6-tris(3',5'-butyl-4-hydroxybenzyl)benzene, octadecyl ester of β-3,5-ditert.-butyl - 4 - hydroxyphenylpropionic acid, phenol/aldehyde condensates, ultra-violet absorbing agents such as 2-hydroxybenzophenones, benztriazoles and nickel ketoximes in one, two or more component systems.

Suitable amounts of these other stabilisers are from 0.001 to 5%, and preferably from 0.1 to 2% of the weight of polymer.

Other conventional additives may also be present in the polymer including other antioxidants, cross-linking agents, blowing agents, plasticisers, fillers, slip agents, antistatic agents, pigments and nickel and calcium soaps.

By the process of the invention effective protection is afforded against degradation caused by heat, light or oxidation. Polypropylene for example is protected against oxidation by the phenol alone. The protection is found also in the presence of metal ions such as copper or cobalt which catalyse oxidation, although in these circumstances it is desirable to have present also another antioxidant such as a metal deactivator as synergist.

Higher melting polyolefines such as poly-4-methylpentene-1 are stabilised against thermal degration during melting and extrusion or otherwise shaping without causing discoloration or photosensitisation by the incorporation of the phenol of the invention in conjunction with melt-stabilisers.

The invention is illustrated but not limited by the following examples in which all parts and percentages are by weight unless otherwise stated.

EXAMPLE 1

27.6 parts of 80% aqueous sulphuric acid are added dropwise during 2 hours to a stirred solution of 2.7 parts of 3,5-dimethylanisole and 18.9 parts of 2,6-di-tert.-butyl-4-hydroxymethylphenol in 134 parts of methylene dichloride. The temperature of the reaction mixture is maintained between 0° and 5° C. After 3 hours the methylene chloride layer is washed acid-free with water and dried over anhydrous calcium chloride and evaporated. After treatment with petroleum ether (boiling point 30–40° C.) the product, 2,4,6 - tris - (3,5 - di-tert. - butyl - 4 - hydroxybenzyl) - 3,5 - dimethylanisole, is obtained as a white solid melting between 222 and 224° C. The melting point is raised to 225° C. on recrystallisation from petroleum ether (boiling point 80 to 100° C.). (Found: C, 82.0; H, 9.2. $C_{54}H_{78}O_4$ requires C, 82.0; H, 9.87%.)

EXAMPLE 2

Additives listed in Table 1 are dissolved in about 5 parts of ethanol (or a 50:50 mixture of ethanol and acetone) and diluted with 45 parts of trichlorodifluoroethane. The mixture is poured over 100 parts of unstabilised isotactic polypropylene powder under constant stirring at a temperature of 50° C. until all the solvent is driven off. The powder mixture is moulded in a steam heated platen press at 180° C. for 2 minutes followed by cooling under pressure to give sheets of thickness about 0.75 mm. The pressed sheets are aged in an air oven at 150° C. and the time to degrade the polypropylene as determined by embrittlement is determined.

TABLE 1

| | Parts | | | | | |
|---|---|---|---|---|---|---|
| Polypropylene | 100 | 100 | 100 | 100 | 100 | 100 |
| 2,4,6-tris(3,5-di-t-butyl-4-hydroxy-benzyl)-3,5-dimethylanisole | | 0.25 | | 0.25 | | |
| 1,1,3-tris-(5-butyl-4-hydroxy-2-methylphenyl)-butane (commercial antioxidant) | | | | | 0.25 | 0.25 |
| Dilaurylthiodipropionate | | | 0.5 | 0.25 | | 0.25 |
| Hours to embrittlement | <12 | 536 | 24 | 872 | 72 | 320 |

EXAMPLE 3

The procedure of Example 2 is repeated using the additives listed in Table 2 which gives the embrittlement times of the stabilised polypropylene.

TABLE 2

| | Parts | | |
|---|---|---|---|
| Polypropylene | 100 | 100 | 100 |
| 1,2-bis[2,4,6-tris(3,5-di-tert.-butyl-4-hydroxybenzyl)-3,5-dimethylphenoxy]ethane | | 0.25 | |
| Bis-[2,4,6-tris(3,5-di-tert.-butyl-4-hydroxybenzyl)-3,5-dimethylphenoxyethyl]adipate | | | 0.25 |
| Hours to embrittlement | <12 | 328 | 343 |

EXAMPLE 4

36.8 parts of 80% sulphuric acid are added dropwise during 45 minutes to a stirred solution of 2.7 parts of 1,2-bis-(3,5 - dimethylphenoxy)ethane and 16.5 parts of 2,6 - di - tert. - butyl - 4 - hydroxymethylphenol in 100 parts of toluene. The temperature of the reaction is maintained at 0–5° C. during the addition and for one hour afterwards. The organic phase is separated and washed acid-free with water and evaporated. The residue is treated with petroleum ether (boiling point from 30–40° C.) to give 1,2-bis[2,4,6-tris-(3,5-di-tert.-butyl-4-hydroxybenzyl) - 3,5 - dimethylphenoxy]ethane as a white crystalline solid. After recrystallisation from petroleum ether (boiling point from 100–120° C.) the product melts at 233° C.

EXAMPLE 5

A solution of 41.5 parts of β-hydroxyethoxy-3,5-dimethylbenzene, 18.25 parts of adipic acid and 1 part of p-toluenesulphonic acid is heated at the boiling point in 100 parts of toluene using a Dean and Stark apparatus until 4.5 parts of water had been collected. The toluene is washed acid-free with water and evaporated. The solid residue is recrystallised from petroleum ether (boiling point from 100–120° C.) to give bis-(3,5-dimethylphenoxyethyl)adipate melting point 79° C. (Found: C, 70.2; H, 7.8. $C_{26}H_{34}O_6$ requires C, 70.0; H, 7.7%.)

36.8 parts of 80% sulphuric acid are added dropwise during one hour to a stirred cooled (0–5° C.) solution of 4.42 parts of bis-(3,5-dimethylphenoxy)ethyl]adipate and 14.76 parts of 2,6-di-tert.-butyl-4-hydroxymethylphenol in 100 parts of toluene. The temperature is maintained at between 0° C. and 5° C. throughout the addition and for one hour afterwards. The organic phase is washed acid-free with water and evaporated. The residue is treated with petroleum ether (boiling point from 30–40° C.) and filtered off to give a white solid. This is recrystallised from petroleum ether (boiling point from 100–120° C.) to give bis-[2,4,6 - tris(3,5-di-tert.-butyl-4-hydroxybenzyl) - 3,5 - dimethylphenoxyethyl]adipate of melting point 195° C. (Found: C, 81.3%; H, 9.6. $C_{116}H_{166}O_{12}$ requires C, 81.4%; H, 9.6%.)

We claim:
1. New phenols selected from the group consisting of 2,4,6 - tris(3,5 - di - tert - butyl - 4 - hydroxybenzyl)-3,5-dimethylanisole, 2,4,6 - tris(3,5 - di - tert - butyl - 4 - hydroxybenzyl) - 3,5 - diethylanisole, 2,4,6 - tris(3,5-di-tert - butyl - 4 - hydroxybenzyl) - 3 - ethyl - 5 - methylanisole and 1,2-bis-[2,4,6 - tris(3,5 - di - tert - butyl - 4-hydroxybenzyl)-3,5-dimethylphenoxy]ethane.

References Cited

UNITED STATES PATENTS

| | | | |
|---|---|---|---|
| 2,684,386 | 7/1954 | Chiddix et al. | 260—613 |
| 2,688,625 | 9/1954 | Bell et al. | 260—613 |
| 2,744,882 | 5/1956 | Bender et al. | 260—613 |
| 2,745,726 | 5/1956 | Young et al. | 260—613 |
| 3,026,264 | 3/1962 | Rocklin et al. | |
| 3,026,297 | 3/1962 | Spacht. | |
| 3,047,503 | 7/1962 | Jaffe et al. | |
| 3,067,259 | 12/1962 | Bailey | 260—613 |
| 3,093,688 | 6/1963 | Kordzinski et al. | 260—613 |
| 3,109,829 | 11/1963 | Brown | 260—613 |

FOREIGN PATENTS 687,474   5/1964   Canada.

OTHER REFERENCES

Wegler et al.: Chem. Abs., vol. 48 (1954), pp. 640–641.

Kammerer et al.: Chem. Abs., vol. 55 (1961), pp. 10,363–10,364.

BERNARD HELFIN, Primary Examiner

U.S. Cl. X.R.

260—45.95